United States Patent
Nishioka

(10) Patent No.: US 12,316,937 B2
(45) Date of Patent: May 27, 2025

(54) IMAGE PICKUP APPARATUS SUPPRESSING FLANGE BACK CHANGES

(71) Applicant: CANON KABUSHIKI KAISHA, Tokyo (JP)

(72) Inventor: Daisuke Nishioka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 9 days.

(21) Appl. No.: 18/152,232

(22) Filed: Jan. 10, 2023

(65) Prior Publication Data

US 2023/0232091 A1 Jul. 20, 2023

(30) Foreign Application Priority Data

Jan. 18, 2022 (JP) ................................. 2022-005483

(51) Int. Cl.
*H04N 23/54* (2023.01)
*H04N 23/52* (2023.01)

(52) U.S. Cl.
CPC ............. *H04N 23/54* (2023.01); *H04N 23/52* (2023.01)

(58) Field of Classification Search
CPC ........ H04N 23/54; H04N 23/52; H04N 23/55; H04N 23/57; G02B 7/028; G03B 17/55
See application file for complete search history.

(56) References Cited

U.S. PATENT DOCUMENTS

| | | | |
|---|---|---|---|
| 2019/0166289 A1 | 5/2019 | Knutsson et al. | |
| 2019/0371833 A1 | 12/2019 | Hogyoku | |
| 2020/0001787 A1* | 1/2020 | Lu | B60Q 9/008 |
| 2020/0382729 A1 | 12/2020 | Mayumi | |

FOREIGN PATENT DOCUMENTS

| | | | |
|---|---|---|---|
| JP | 07058909 A | * | 3/1995 |
| JP | 3173927 B2 | | 6/2001 |

OTHER PUBLICATIONS

UK Search Report issued on Jun. 22, 2023, a copy of which is enclosed, that issued in the corresponding UK Patent Application No. 2218806.4.

* cited by examiner

*Primary Examiner* — Ahmed A Berhan
(74) *Attorney, Agent, or Firm* — Cowan, Liebowitz & Latman, P.C.

(57) ABSTRACT

An image pickup apparatus includes, in order from an image side to an object side along an optical axis a first base member, a second base member fixed to the first base member, an image sensor substrate having an image sensor mounted thereon, and being fixed to the second base member, and a structural member configured to support a lens. A linear thermal expansion coefficient of the second base member is larger than that of the first base member.

20 Claims, 10 Drawing Sheets

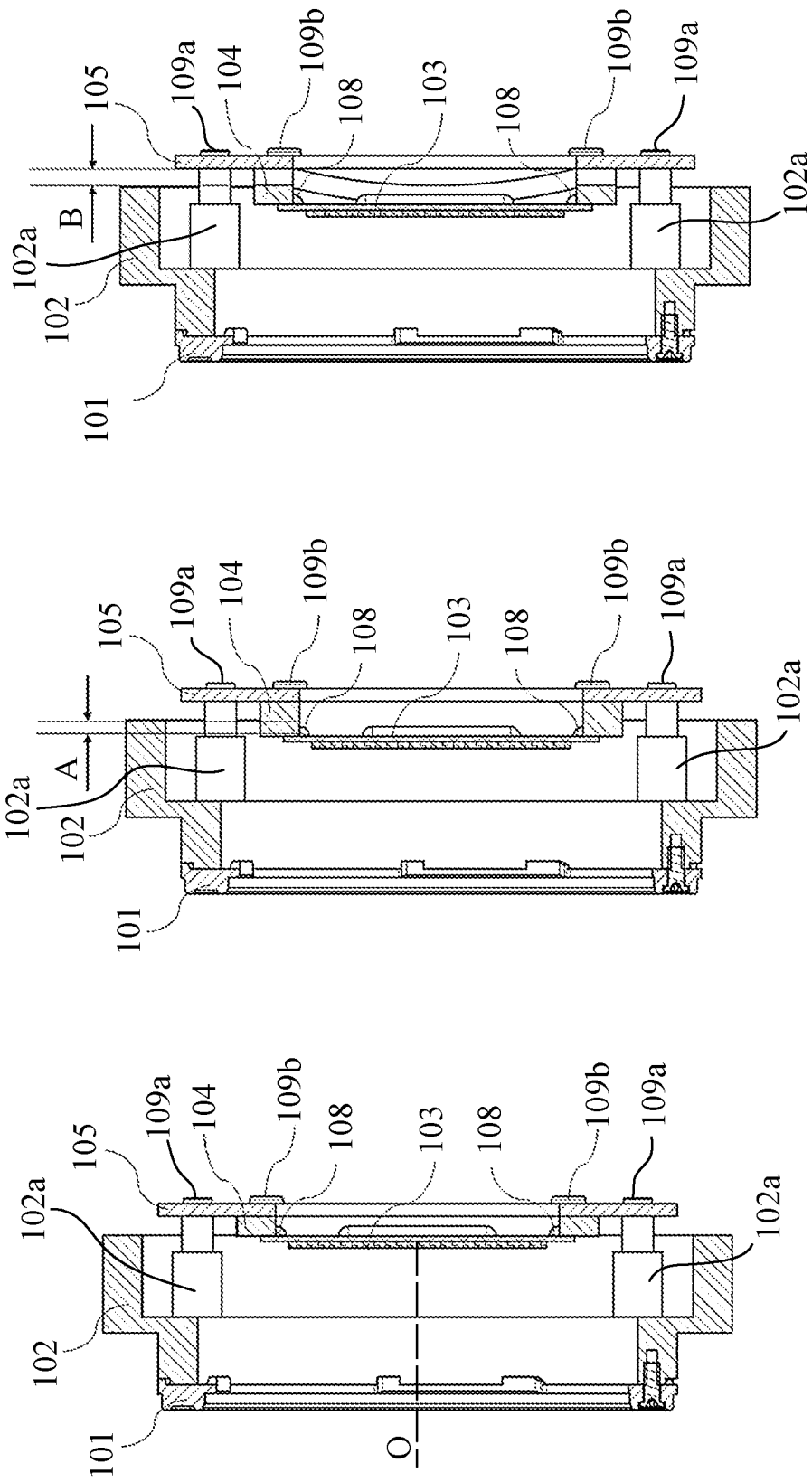

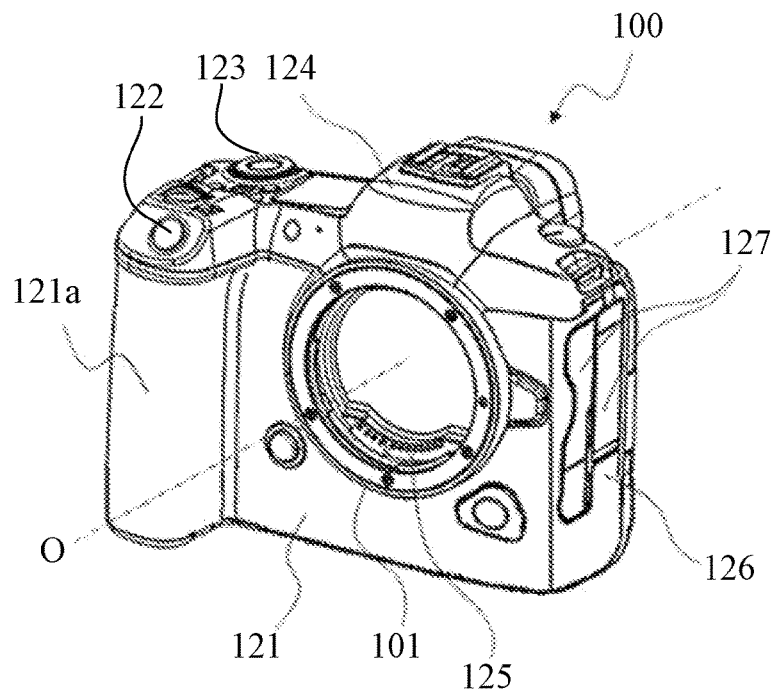
FIG. 12
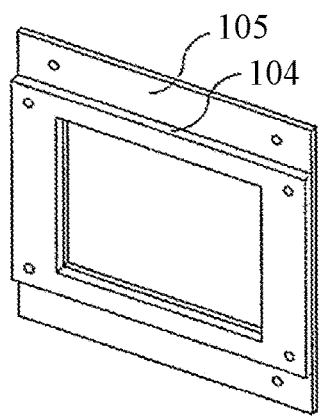 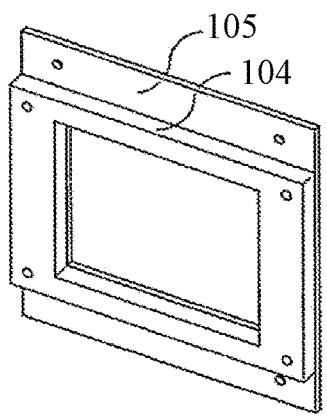 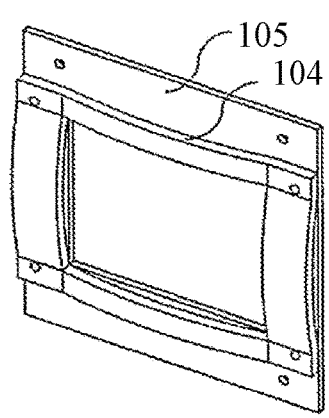
FIG. 13A　　　FIG. 13B　　　FIG. 13C

IMAGE PICKUP APPARATUS SUPPRESSING FLANGE BACK CHANGES

BACKGROUND

Technical Field

One of the aspects of the disclosure relates to an image pickup apparatus, such as a digital still camera and a digital video camera.

Description of the Related Art

The temperature in the image pickup apparatus rises due to heat generated from an image sensor such as a CMOS sensor. At this time, due to linear expansion of a member that holds the image sensor, a distance between a final lens surface closest to an image plane and the image sensor (or a flange focal length between a mount surface where the interchangeable lens is attached and the image sensor in a lens interchangeable type camera) may change, and thereby a focus state may change.

Japanese Patent No. 3173927 discloses an image pickup apparatus in which a substrate mounted with an image sensor at the center of the substrate includes a member made by pasting together a high thermal expansion member and a low thermal expansion member. This image pickup apparatus restrains the distance between the final lens surface and the image sensor from changing in a case where the temperature inside the image pickup apparatus rises, by allowing the substrate to deform (curve) so that the central portion of the substrate becomes convex toward the lens side due to a difference in a linear expansion amount between the high thermal expansion member and the low thermal expansion member.

However, in order to enhance the effect of restraining the distance change without increasing the size of the substrate mounted with the image sensor, it is necessary for the image pickup apparatus disclosed in Japanese Patent No. 3173927 to increase the deformation amount (curvature) of the substrate. As a result, the substrate and image sensor may be damaged.

SUMMARY

One of the aspects of the disclosure provides an image pickup apparatus that can restrain a distance between a final lens surface and an image sensor from changing in a case where temperature changes without increasing a size or deformation amount of a member that holds the image sensor.

An image pickup apparatus according to one aspect of the disclosure includes, in order from an image side to an object side along an optical axis a first base member, a second base member fixed to the first base member, an image sensor substrate having an image sensor mounted thereon, and being fixed to the second base member, and a structural member configured to support a lens. A linear thermal expansion coefficient of the second base member is larger than that of the first base member.

Further features of the disclosure will become apparent from the following description of embodiments with reference to the attached drawings.

BRIEF DESCRIPTION OF THE DRAWINGS

FIGS. 1A to 1D are an exploded perspective view of an image sensor holding structure according to a first embodiment and sectional views illustrating positional changes of an image sensor in a case where temperature rises.

FIG. 12 is a schematic diagram of an image pickup apparatus according to the first embodiment.

FIGS. 13A to 13C are schematic front perspective views illustrating deformation of the second base member according to the first embodiment in a case where the temperature rises.

DESCRIPTION OF THE EMBODIMENTS

Figure 1A:
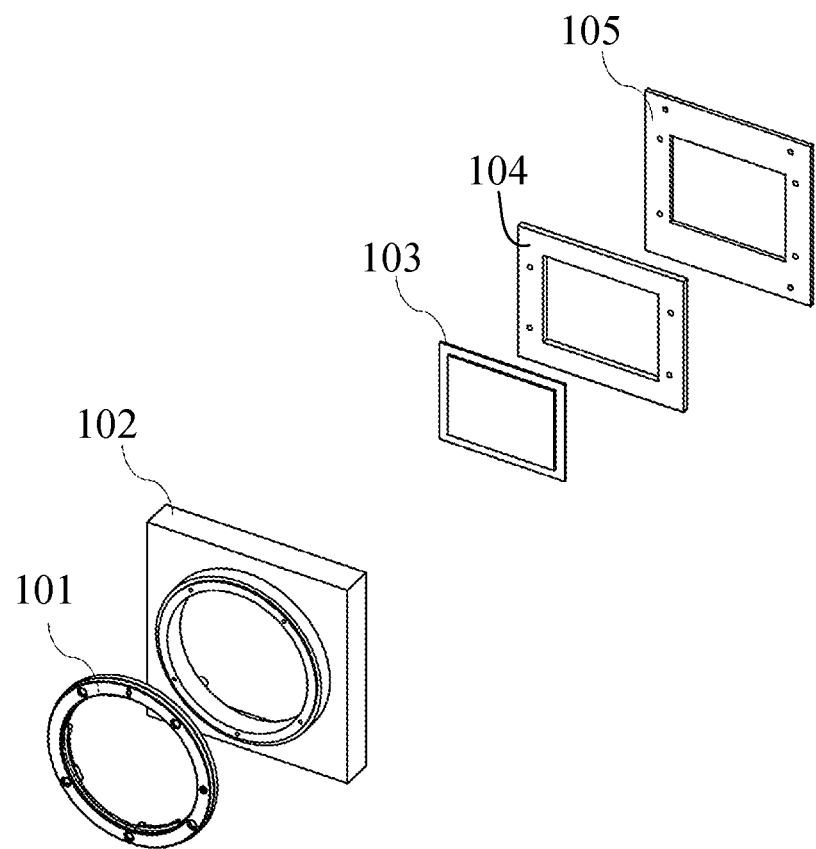

Referring now to the accompanying drawings, a description will be given of embodiments according to the disclosure.

First Embodiment

FIG. 12 is an external view of an lens interchangeable type digital camera 100 as an image pickup apparatus according to a first embodiment of the disclosure. The camera 100 includes a mount 101 at the center of a front cover 121, to which an unillustrated imaging lens unit (interchangeable lens) may be detachably attached. The mount 101 is fixed to a chassis, which will be described below. O denotes an optical axis of the imaging lens unit, and a direction in which the optical axis O extends is called an optical axis direction. Part of the inner circumference of the mount 101 includes a terminal unit 125 that is electrically connected to the imaging lens unit. The front cover 121 includes a grip portion 121a through which a user grips the camera 100.

Operation members (such as a shutter button 122 and a mode dial 123) are attached to a top cover 124 and can be operated by the user. Attached to a side cover 109 is an unillustrated external communication terminal that enables communication with the outside, and a protective cover 127 that covers an insertion slot for a recording medium such as an unillustrated semiconductor memory detachably attached to the camera 100.

An unillustrated rear cover includes a rear display that displays a live-view image, a captured image, and various information, and an eyepiece portion through which the user peers into an electronic viewfinder.

FIG. 1A illustrates an exploded perspective view of an image sensor holding structure in the camera 100. FIG. 1B illustrates a section of the image sensor holding structure.

FIG. 13A is a front perspective view of the first base member 105 and the second base member 104 according to the first embodiment of the disclosure.

The mount 101 described above is fixed to a front end (left end in FIGS. 1A and 1B) of a chassis 102 as a structural member. The chassis 102 is made of a resin material. The terminal unit 125 illustrated in FIG. 12 is omitted.

At three locations around the optical axis O inside the chassis 102, there are support shaft portions 102a that extend to the rear (surface) side (corresponding to a right side in FIG. 1B) opposite to the mount side (lens side) which is a front side. A first base member 105 is attached (fixed) to rear ends of the support shaft portions 102a as part of the chassis 102 on a side opposite to the mount side with screws 109a. A second base member 104 is disposed closer to the mount 101 than a first base member 105 and is fixed (fastened) to the first base member 105 at four locations around the optical axis of the first base member 105 with screws 109b. An image sensor 103 includes an image sensor substrate and an image sensor such as a CMOS sensor or a CCD sensor, wherein the image sensor substrate is fixed with an adhesive 108 to a surface on the mount side of the second base member 104.

As illustrated in FIG. 1A, the second base member 104 is fastened to the first base member 105 with the screws 109b at a plurality of locations (four locations in this figure) outside the image sensor 103 (outside an area where the image sensor 103 is fixed). The image sensor 103 captures (photoelectrically converts) an object image as an optical image formed by the imaging lens unit. The image sensor 103 may be fixed to the second base member 104 with screws.

The imaging plane of the image sensor 103 is located so as to satisfy a predetermined flange focal length (in other words, a distance between the image sensor 103 and the final lens surface closest to the image plane of the imaging lens unit) from the mount surface, which is the front end surface of the mount 101. Unillustrated exterior parts and an electronic substrate other than the image sensor 103 are also fixed to the chassis 102. A signal processing chip that performs various signal processing such as image processing is mounted on the electronic substrate.

In a case where the camera 100 captures an image, the image sensor 103 and signal processing chip generate heat. As a result, the temperature of the chassis 102 thermally connected to the image sensor 103 and the signal processing chip rises, the chassis 102 linearly expands, and the position of the image sensor 103 moves to the back side in the optical axis direction. That is, the flange focal length becomes larger than that before imaging. Due to the increase in the flange focal length, the focus position of the imaging lens unit shifts from the imaging plane of the image sensor 103, and the object image is blurred. In general, a resin material has a linear thermal expansion coefficient larger than that of a metal material. Therefore, in a case where the chassis 102 is made of the resin material as in this embodiment, the flange focal length remarkably increases.

The second base member 104 to which the image sensor 103 is fixed linearly expands as its temperature rises due to the heat generated by the image sensor 103. Moreover, the temperature of the first base member 105 to which the second base member 104 is fixed also rises. However, due to thermal resistance between the second base member 104 and the first base member 105, the temperature rise of the first base member 105 is smaller than that of the second base member 104.

FIG. 1C illustrates a positional change in the optical axis direction of the image sensor 103 due to the linear expansions of the first base member 105 and the second base member 104. FIG. 13B is a schematic front perspective view illustrating deformation caused by the linear expansion in the optical axis direction of the second base member 104 according to the first embodiment of the disclosure.

The surface on the mount side of the first base member 105 contacts the support shaft portions 102a and is screwed to the support shaft portions 102a, thereby limiting the positional change (thickness change) in the optical axis direction. The linear expansion of the first base member 105 in the optical axis direction is less likely to occur. On the other hand, the second base member 104 contacts the first base member 105 on the side opposite to the mount side, but linearly expands toward the mount side because its positional change toward the mount side is not restricted.

Assume that A is a positional change amount (linear expansion amount) of the surface on the mount side of the second base member 104 toward the mount side due to the linear expansion. Then, the image sensor 103 fixed to the second base member 104 approaches the mount 101 by A unless the image sensor 103 positionally changes (flange focal length increases) toward the rear side described above. Therefore, even if the chassis 102 linearly expands in a direction of moving the image sensor 103 to the backside, an increase in the flange focal length can be reduced by A by utilizing the linear expansion of the second base member 104.

The positional change amount A becomes larger as the second base member 104 becomes larger in the optical axis direction, and as the coefficient of linear (or thermal) expansion (linear or thermal expansion coefficient) of the second base member 104 becomes larger. Moreover, the positional change amount A becomes larger as the temperature rise amount of the second base member 104 becomes larger.

FIG. 1D illustrates a change in the position of the image sensor 103 in the optical axis direction due to deformation toward the mount side caused by linear expansion of the second base member 104 in the direction orthogonal to the optical axis O. FIG. 13C is a schematic front perspective view illustrating deformation caused by the linear expansion in the direction orthogonal to the optical axis direction of the second base member 104 according to the first embodiment of the disclosure. As the temperature rises, the first base member 105 and the second base member 104 linearly expand in the direction orthogonal to the optical axis O, respectively. As described above, a temperature rise amount of the second base member 104 during imaging is larger than that of the first base member 105. Therefore, in a case where the linear thermal expansion coefficient of the second base member 104 is larger than that of the first base member 105, the linear expansion amount of the second base member 104 is larger than that of the first base member 105. The first base member 105 and the second base member 104 are fixed in a direction orthogonal to the optical axis O with the screws 109b. Hence, the second base member 104 deforms (curves) so that the central portion of the second base member 104 becomes convex or protrudes toward the mount side by a difference between the linear expansion amount of the second base member 104 and the linear expansion amount of the first base member 105.

Assume that B is a maximum value of this curvature convex amount as the deformation amount of the second base member 104 toward the mount side. Then, the image sensor 103 fixed to the second base member 104 approaches the mount 101 by B unless the position of the image sensor 103 changes to the rear side. Therefore, even if the chassis 102 linearly expands in the direction of moving the image sensor 103 toward the rear side, an increase amount of the flange focal length can be reduced by B by utilizing the curvature of the second base member 104 toward the mount side due to the linear expansion of the second base member 104 in the direction orthogonal to the optical axis O.

The maximum curvature convex amount B becomes larger as the linear thermal expansion coefficient of the second base member 104 becomes larger than that of the first base member 105, and a difference between them becomes larger. The maximum curvature convex amount B becomes larger as a distance between the screws 109b for fixing the first base member 105 and the second base member 104 becomes longer. Moreover, the maximum curvature convex amount B becomes larger as a difference between the temperature rise amount of the second base member 104 and the temperature rise amount of the first base member 105 becomes larger.

Thus, in this embodiment, the second base member 104 is fixed to the first base member 105 so that the second base member 104 can linearly expand toward the mount side (lens side) and can deform toward the mount side due to the linear expansion of the second base member 104 in the direction orthogonal to the optical axis O. Hence, an increase in the flange focal length can be suppressed by the sum of the linear expansion amount (A) of the second base member 104 toward the mount side due to the temperature rise during imaging and the deformation amount (B) of the second base member 104 toward the mount side due to the linear expansion of the second base member 104 in the direction orthogonal to the optical axis O.

At this time, the linear expansion amount (A) and the deformation amount B can be adjusted by selecting the materials of the first base member 105 and the second base member 104 based on their linear thermal expansion coefficients. More specifically, the material of the second base member 104 may be selected so as to obtain the deformation amount (B) within a range that does not damage the image sensor 103 and the linear expansion amount (A) that can suppress an increase in the flange focal length as much as possible.

Thereby, changes in the flange focal length due to temperature changes can be suppressed without increasing the sizes and deformation amounts of the first and second base members 104 and 105 that hold the image sensor 103.

Second Embodiment

Figure 2:
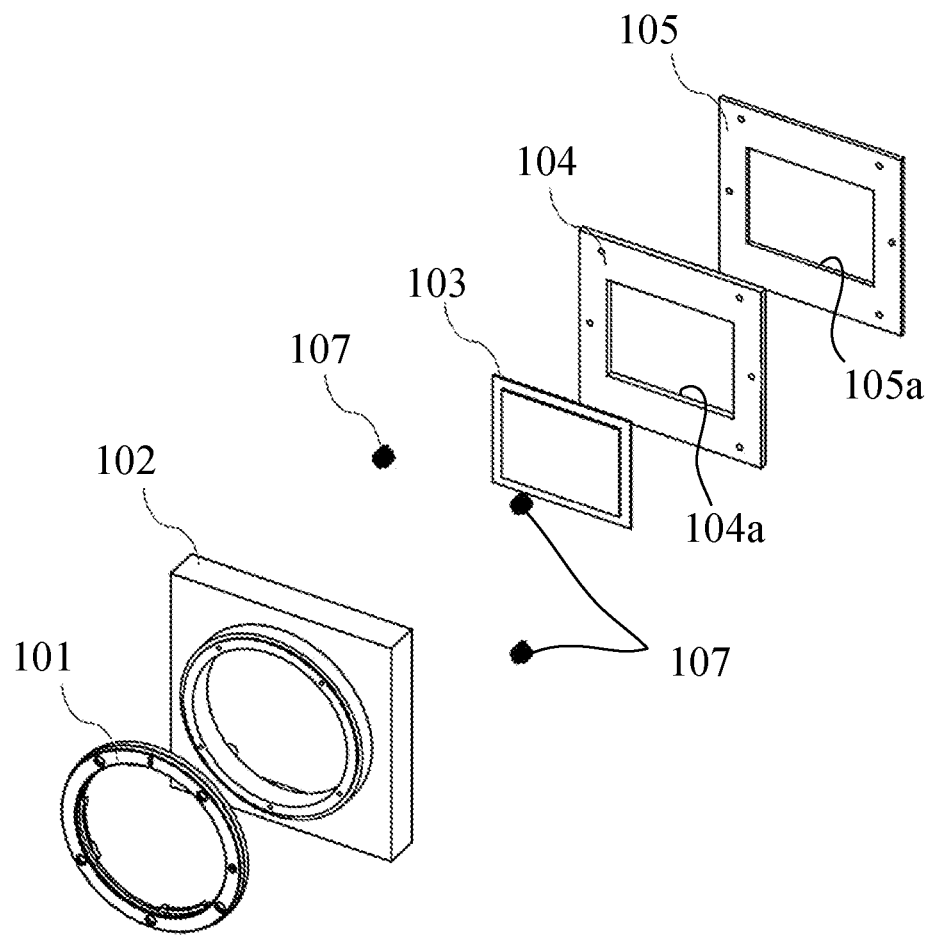
FIG. 2 is an exploded perspective view of the image sensor holding structure according to a second embodiment.
Figure 3:
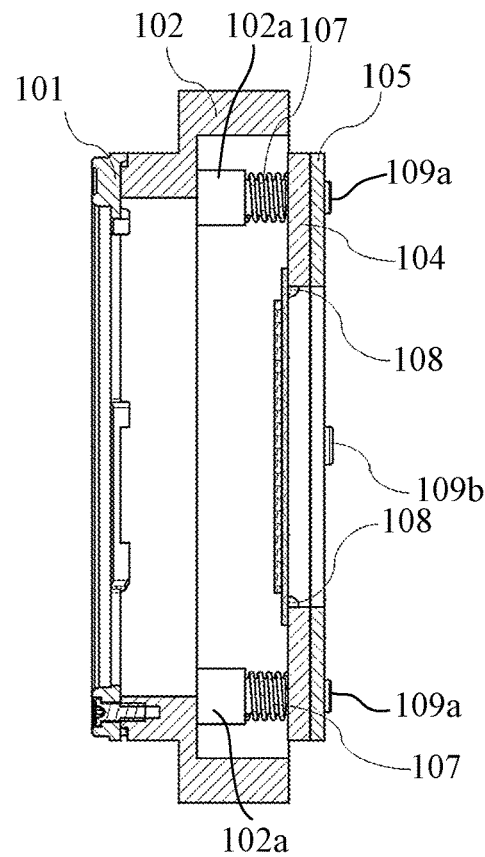
FIG. 3 is a sectional view of the image sensor holding structure according to the second embodiment.

FIG. 2 illustrates an exploded image sensor holding structure according to a second embodiment. FIG. 3 illustrates a section of the image sensor holding structure according to this embodiment. Those elements in FIGS. 2 and 3, which are corresponding elements in the first embodiment, will be designated by the same reference numerals.

In this embodiment, the first base member 105 and the second base member 104 are configured as members having the same shape, and are fastened together at two locations with the screws 109b. A bimetallic material in which the first base member 105 and the second base member 104 are bonded together may be used.

The three support shaft portions 102a of the chassis 102 have a large diameter portion on the root side and a small diameter portion at the tip (rear end) side, and a coil spring 107 as a biasing member is disposed on the outer circumference of each small diameter portion. Holes into which the small diameter portions of the three support shaft portions 102a can be inserted are formed in the first base member 105 and the second base member 104 at three locations around the optical axis. The first base member 105 and the second base member 104 are assembled to the chassis 102 such that the small diameter portion of each support shaft portion 102a is inserted into each hole. Thereby, the coil spring 107 is sandwiched between the large diameter portion of each support shaft portion 102a and the second base member 104.

The first base member 105 and the second base member 104 are movable (linearly expandable) to the mount side along the small diameter portion of each support shaft portion 102a while compressing the coil spring 107. In this state, by tightening the screw 109a to the rear end of the small diameter portion of each support shaft portion 102a, the head of the screw 109a prevents the first base member 105 and the second base member 104 from moving (linearly expanding) to a side opposite to the mount side.

As illustrated in FIG. 2, the second base member 104 is fastened to the first base member 105 with the screws 109b at a plurality of locations (two locations) outside the image sensor 103.

In this structure, as first base member 105 and the second base member 104 linearly expand in the optical axis direction, the surface on the mount side of the second base member 104 approaches the mount 101 by the sum of their linear expansion amounts. Assume that A is a positional change amount of the surface on the mount side of the second base member 104 toward the mount 101 due to the linear expansions of the first base member 105 and the second base member 104. Then, unless the position of the image sensor 103 described in the first embodiment changes toward the rear side, the image sensor 103 fixed to the second base member 104 approaches the mount 101 by A+B. Therefore, even if the chassis 102 linearly expands in the direction of moving the image sensor 103 to the rear side, an increase in the flange focal length can be reduced by A by utilizing the linear expansions of the first base member 105 and the second base member 104.

The positional change amount A becomes larger as the sizes of the first base member 105 and the second base member 104 in the optical axis direction become larger, and as the linear thermal expansion coefficients of the first base member 105 and the second base member 104 become larger. Moreover, the positional change amount A becomes larger as the temperature rise amounts of the first base member 105 and the second base member 104 become larger.

The first base member 105 and the second base member 104 also linearly expand in the direction orthogonal to the optical axis O. As described above, the temperature rise amount of the second base member 104 during imaging is larger than that of the first base member 105. Therefore, in a case where the linear thermal expansion coefficient of the second base member 104 is larger than that of the first base member 105, the linear expansion amount of the second base member 104 is larger than that of the first base member 105. As a result, the second base member 104 is curved by a difference between the linear expansion amount of the second base member 104 and the linear expansion amount of the first base member 105 so that the central portion of the second base member 104 can be convex toward the mount side. Where B is the maximum value of the curvature convex amount of the second base member 104, the image sensor 103 fixed to the second base member 104 approaches the mount 101 by B unless the position of the image sensor 103 changes to the rear side. Therefore, even if the chassis 102 linearly expands in the direction of moving the image sensor 103 to the rear side, an increase in the flange focal length can be reduced by B by utilizing the curvature of the second base member 104 in the direction orthogonal to the optical axis O toward the mount side.

The maximum curvature convex amount B becomes larger as the linear thermal expansion coefficient of the second base member 104 is larger than that of the first base member 105 and a difference between the linear thermal expansion coefficient of the second base member 104 and that of the first base member 105 becomes larger. In addition, the maximum curvature convex amount B becomes larger as a distance between the screws 109b for fixing the first base member 105 and the second base member 104 becomes larger. Moreover, the maximum curvature convex amount B becomes larger as a difference between the temperature rise amount of the second base member 104 and the temperature rise amount of the second base member 105 becomes larger.

Thus, even in this embodiment, the second base member 104 is fixed to the first base member 105 so that the second base member 104 can linearly expand toward the mount side and can deform toward the mount side due to the linear expansion of the second base member 104 in the direction orthogonal to the optical axis O. This embodiment can suppress an increase in the flange focal length by the sum (A) of the linear expansions of the first base member 105 and the second base member 104 toward the mount side due to temperature rise during imaging in addition to the deformation amount (B) of the second base member 104 toward the mount due to the linear expansion in the direction orthogonal to the optical axis O.

At this time, by selecting materials for the first base member 105 and the second base member 104 based on their linear thermal expansion coefficients, the linear expansion amounts of the first base member 105 and the second base member 104 are (A) and the deformation amount B of the second base member 104 can be adjusted. More specifically, the material for the second base member 104 may be selected so as to obtain the deformation amount (B) within a range that does not damage the image sensor 103, and the materials for the first base member 105 and the second base member 104 may be selected so as to obtain the sum (A) of the linear expansion amounts that can suppress an increase in the flange focal length.

Thereby, changes of the flange focal length caused by the temperature change can be suppressed without increasing the size or deformation amount of the member that holds the image sensor 103.

Figure 4:
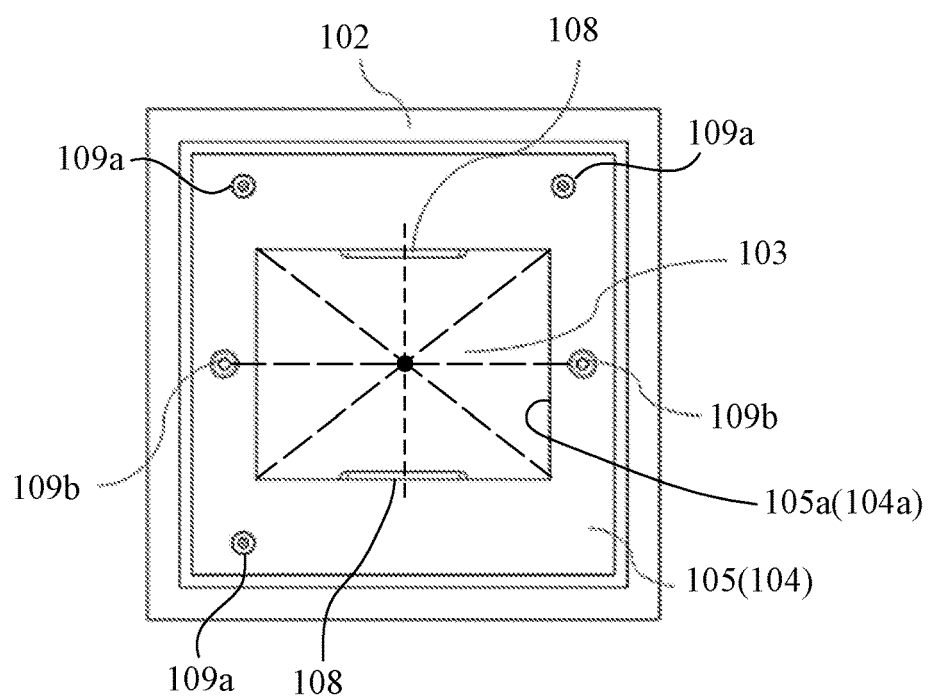
FIG. 4 is a rear view of the image sensor holding structure according to the second embodiment.

FIG. 4 illustrates the image sensor holding structure according to this embodiment viewed from the rear side (or viewed from the optical axis direction). Both the first base member 105 and the second base member 104 have rectangular openings 105a and 104a. These openings 105a and 104a are also illustrated in FIG. 2. An intersection of diagonal lines (indicated by alternate long and short dash lines in FIG. 4) of the opening 104a (105a) is located on the optical axis O. The second base member 104 is fastened to the first base member 105 with the two screws 109b at two locations outside the area where the image sensor 103 is fixed and near the centers of two short sides out of the four sides of the opening 104a.

The image sensor 103 is fixed to the second base member 104 with adhesives 108 at two locations near the centers of two long sides facing each other out of the four sides of the opening 104a. That is, the image sensor 103 is fixed to the second base member 104 with the adhesives 108 at positions other than the fastening positions of the two screws 109b to the first base member 105 around the opening 104a of the second base member 104.

In this structure, in a case where the second base member 104 is curved so as to be convex (protrude) toward the mount side due to the temperature rise as described above, the most convex portions of the second base member 104 are located on the perpendicular bisector (indicated by a broken line in FIG. 4) of a line segment that connects the fastening positions of the two screws 109b. Therefore, a movement of the image sensor 103 to the rear side due to the linear expansion of the chassis 102 can be reduced by A+B by fixing the image sensor 103 to the second base member 104 near these most convex portions, that is, near the centers of the long sides of the opening 104a. As described above, B becomes larger as the distance between the two screws 109b becomes larger. In addition, by fixing the image sensor 103 to the second base member 104 near the two most convex portions, even if the second base member 104 is curved, a state in which the normal of the imaging plane of the image sensor 103 accords with the optical axis O can be maintained.

Figure 5:
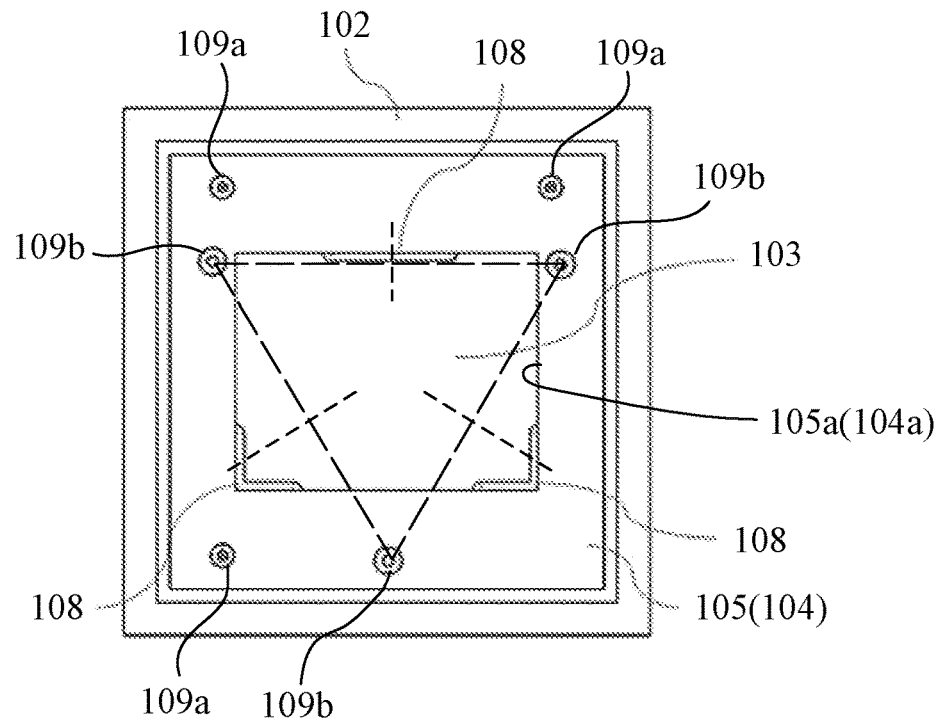
FIG. 5 is a rear view of the image sensor holding structure according to a first variation of the second embodiment.

FIG. 5 illustrates an image sensor holding structure according to a first variation viewed from a rear surface (or viewed from the optical axis direction). Those elements in FIG. 5, which are corresponding elements in FIG. 4, will be designated by the same reference numerals. In this variation, the second base member 104 is fastened to the first base member 105 by three screws 109b that are located outside the image sensor 103 and near the upper ends of two short sides facing each other out of the four sides of the opening 104a and the center of the lower long side.

The image sensor 103 is fixed to the second base member 104 with adhesives 108 at positions other than the fastening positions of the first base member 105 with the three screws 109b. More specifically, the image sensor 103 is fixed to the second base member 104 with the adhesives 108 at three locations near the center of the upper long side and two corners on the lower side of the opening 104a of the second base member 104.

As the second base member 104 is curved so as to be convex (protrude) to the mount side due to the temperature rise, the most convex portions are located on perpendicular bisectors (indicated by broken line in FIG. 5) of three line segments (indicated by alternate long and short dash lines in FIG. 5) that connect the fastening positions of the three screws 109b so as to form a polygon (triangle). Therefore, by fixing the image sensor 103 to the second base member 104 near the most convex portions, that is, near the center of the upper long side and the lower corners of the opening 104a, the movement of the image sensor 103 to the back side due to the linear expansion of the chassis 102 can be reduced by A+B. The maximum curvature convex amount B becomes larger as the distances among the three screws 109b become longer. In addition, by fixing the image sensor 103 to the second base member 104 near the three most convex portions, even if the second base member 104 is curved, a state in which the normal line of the imaging plane of the image sensor 103 accords with the optical axis O can be maintained.

Figure 6:
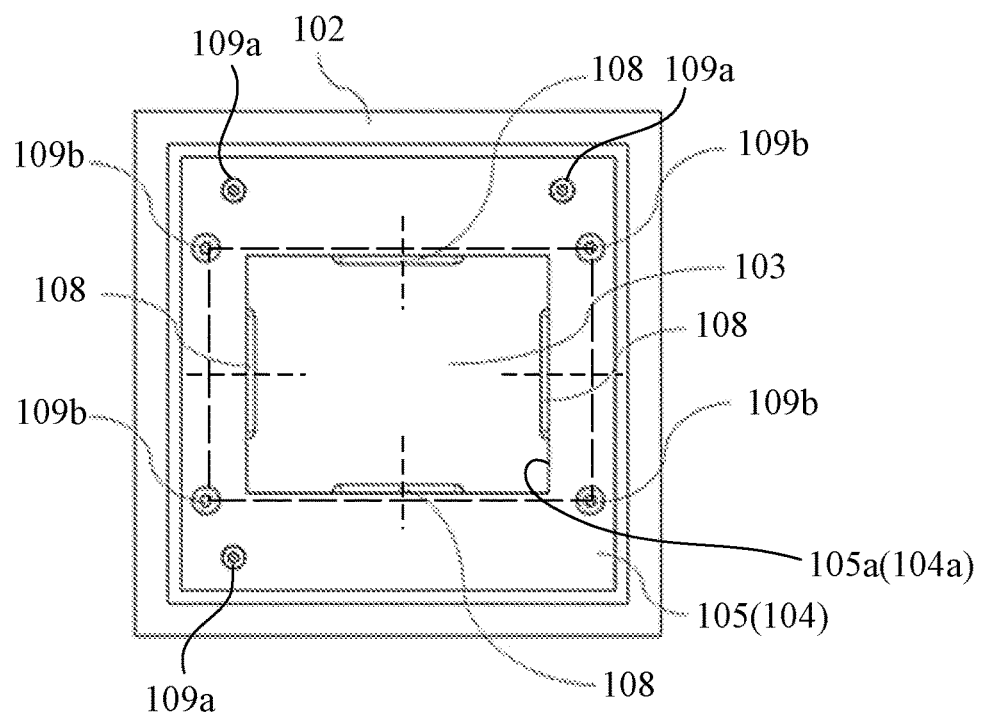
FIG. 6 is a rear view of the image sensor holding structure according to a second variation of the second embodiment.

FIG. 6 illustrates an image sensor holding structure according to a second variation viewed from the rear surface (or viewed from the optical axis direction). Those elements in FIG. 6, which are corresponding elements in FIG. 4, will be designated by the same reference numerals. In this variation, the second base member 104 is fastened to the first base member 105 with four screws 109b located at four locations outside the image sensor 103 and near the upper ends and the lower ends of the two short sides facing each other out of the four sides of the opening 104a.

The image sensor 103 is fixed to the second base member 104 with adhesives 108 at positions other than the fastening positions of the first base member 105 with the three screws 109b. More specifically, the image sensor 103 is fixed to the second base member 104 by the adhesives 108 at four positions near the centers of the upper and lower long sides and near the centers of the left and right short sides of the opening 104a of the second base member 104.

As the second base member 104 is curved so as to be convex toward the mount side due to the temperature rise, the most convex portions are located on perpendicular bisectors (indicated by broken lines in FIG. 6) of four line segments (indicated by alternate long and two short dashes lines in FIG. 6) that connect the fastening positions of the four screws 109b so as to form a polygon (rectangle). Therefore, a movement of the image sensor 103 to the back side due to the linear expansion of the chassis 102 can be reduced by A+B by fixing the image sensor 103 to the second base member 104 near these most convex portions, that is, near the centers of the upper and lower long sides and the left and right short sides of the opening 104a. The maximum curvature convex amount B becomes larger as the distances among the four screws 109b become longer. In addition, by fixing the image sensor 103 to the second base member 104 near the four most convex portions, a state in which the normal line of the imaging plane of the image sensor 103 accords with the optical axis O can be maintained even if the second base member 104 is curved.

Figure 7:
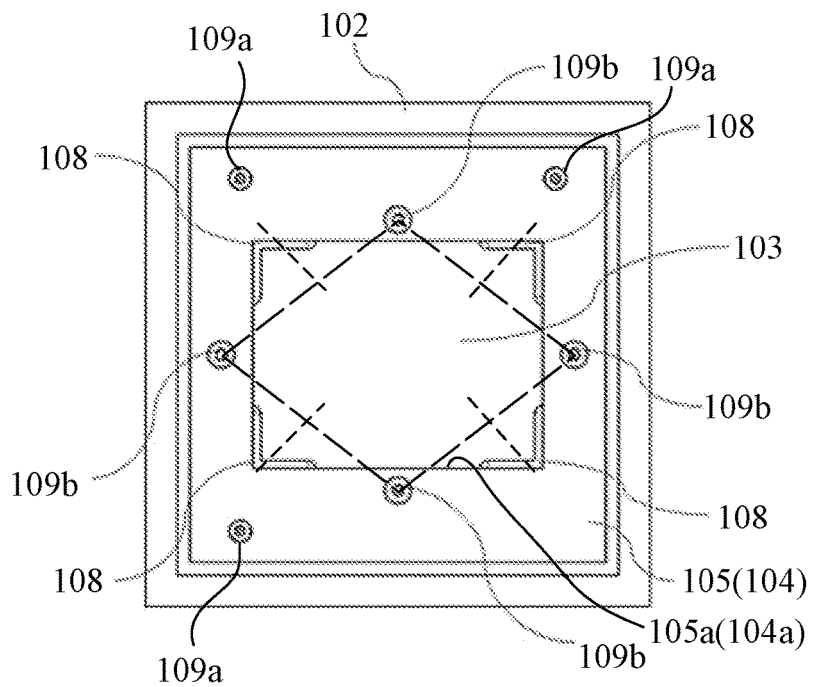
FIG. 7 is a rear view of the image sensor holding structure according to a third variation of the second embodiment.

FIG. 7 illustrates a image sensor holding structure according to a third variation viewed from the rear surface (or viewed from the optical axis direction). Those elements in FIG. 7, which are corresponding elements in FIG. 4, will be designated by the same reference numerals. In this variation, the second base member 104 is fastened to the first base member 105 with four screws 109b at four positions that are located outside the image sensor 103 and near the centers of the four sides of the opening 104a.

The image sensor 103 is fixed to the second base member 104 with adhesives 108 at positions other than the fastening positions of the first base member 105 with the three screws 109b on the second base member 104. More specifically, the image sensor 103 is fixed to the second base member 104 with the adhesives 108 at four positions near four corners of the opening 104a of the second base member 104.

In this structure, as the second base member 104 is curved so as to be convex (protrude) toward the mount side due to the temperature rise, the most convex portions are located on perpendicular bisectors (indicated by broken lines in FIG. 7) of four line segments (indicated by alternative long and two short dashes lines in FIG. 7) that connect the fastening positions of the four screws 109b so as to form a polygon (rhombus). Therefore, the movement of the image sensor 103 to the back side due to the linear expansion of the chassis 102 can be reduced by A+B by fixing the image sensor 103 to the second base member 104 near these most convex portions, that is, near the four corners of the opening 104a. The maximum curvature convex amount B becomes larger as the distances among the four screws 109b become longer. In addition, by fixing the image sensor 103 to the second base member 104 near the four most convex portions, a state in which the normal line of the imaging plane of the image sensor 103 accords with the optical axis O can be maintained even if the second base member 104 is curved.

In the first to third variations, the image sensor 103 is fixed to the second base member 104 with the adhesives 108 at positions on all bisectors of the line segments forming the polygon. Alternatively, the image sensor 103 may be fixed to the second base member 104 at positions on bisectors of at least part of all line segments described above.

Third Embodiment

Figure 8A:
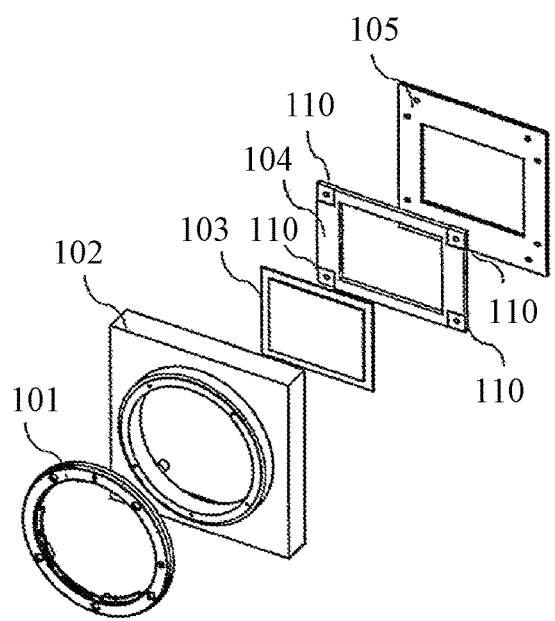
FIGS. 8A and 8B are front and rear exploded perspective views of an image sensor holding structure according to a third embodiment.
Figure 8B:
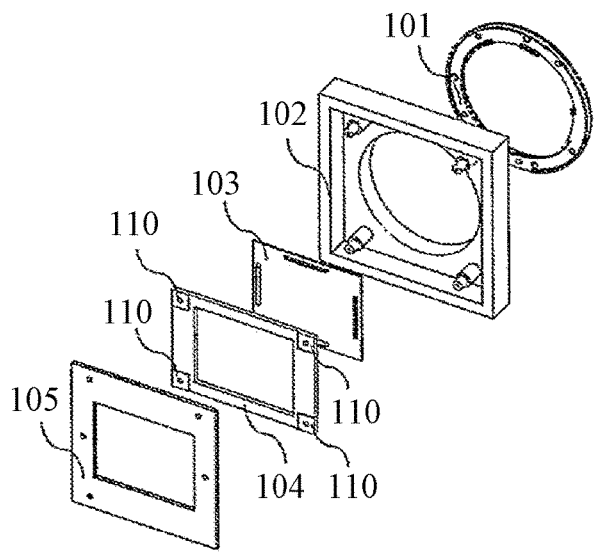
Figure 9:
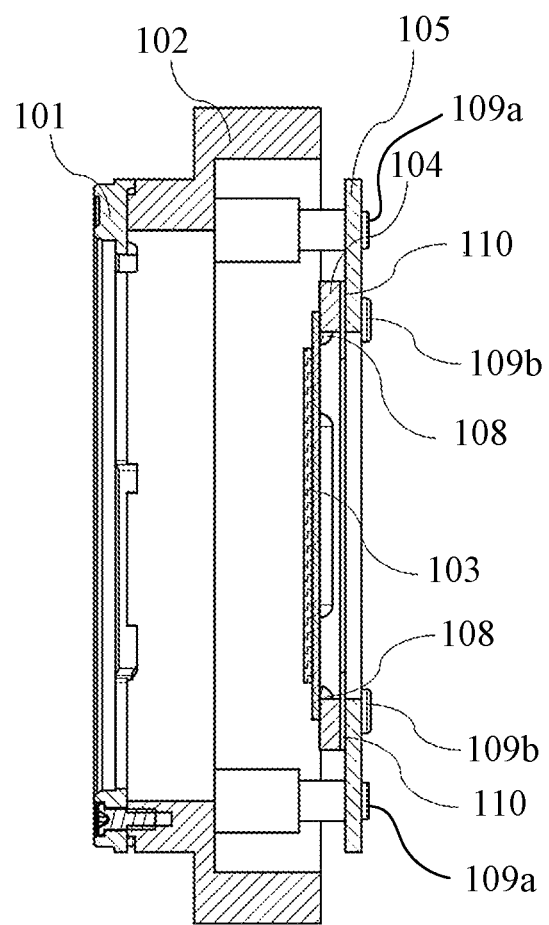
FIG. 9 is a sectional view of the image sensor holding structure according to the third embodiment.

FIG. 8A is a front exploded perspective view of an image sensor holding structure according to a third embodiment. FIG. 8B is a rear exploded perspective view of the image sensor holding structure. FIG. 9 illustrates a section of the image sensor holding structure according to this embodiment. Those elements in FIGS. 8A, 8B, and 9, which are corresponding elements of the first embodiment, will be designated by the same reference numerals.

In this embodiment, the second base member 104 includes contact portions 110 each having a convex shape that is convex to a side opposite to the mount side (to the first base member side) near its four corners. The second base member 104 contacts the first base member 105 at these contact portions 110 and is fastened to the first base member 105 with the screws 109b. Thereby, the contact portion between the second base member 104 and the first base member 105, that is, a heat transfer path from the second base member 104 to the first base member 105 is limited only to the contact portions 110. As a result, the thermal resistance between the second base member 104 and the first base member 105 becomes larger than that of each of the first and second embodiments in which the contact portion between the first and second base members 104 and 105 are not limited. Thus, the temperature rise amount of the second base member 104 becomes larger and the temperature rise amount of the first base member 105 becomes smaller for the same heat amounts generated from the image sensor 103 and the signal processing chip. Hence, the maximum curvature convex amount B of the second base member 104 can be made larger than that of the second embodiment.

Instead of the contact portions 110 of the second base member 104, the first base member 105 may include contact portions that protrudes toward the mount side (second base member side). In addition, a heat shielding member having a low thermal emissivity may be disposed between the first base member 105 and the second base member 104 to prevent heat transmission from radiating from the second base member 104 to the first base member 105.

Fourth Embodiment

Figure 10:
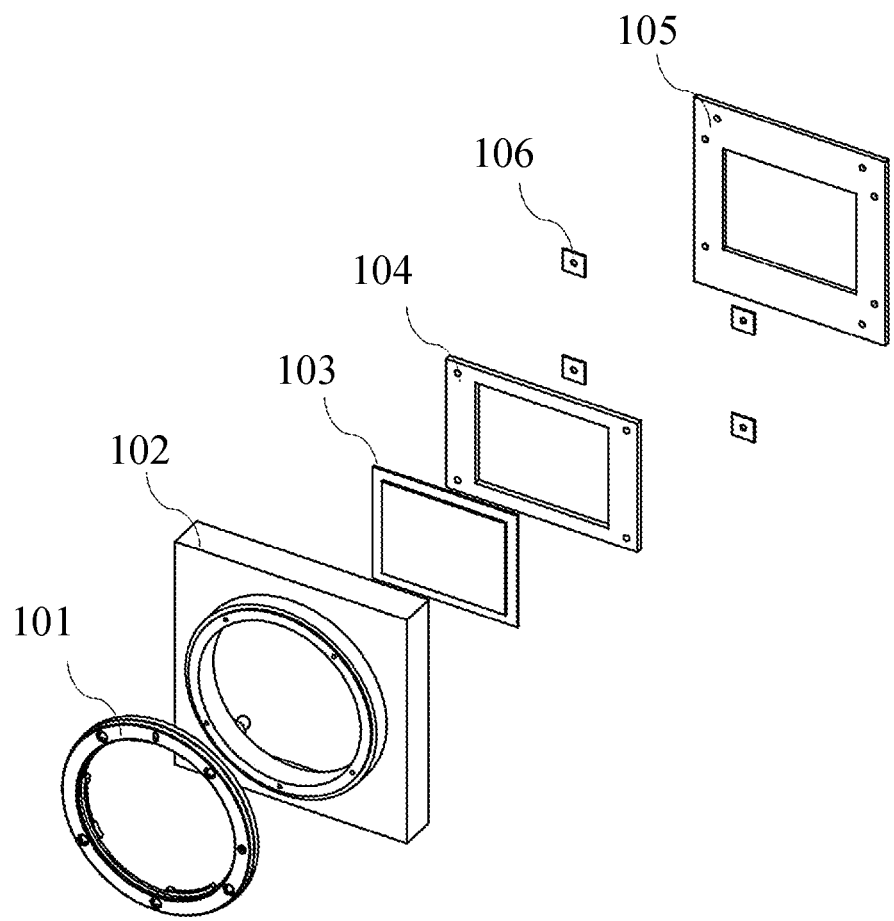
FIG. 10 is an exploded perspective view of an image sensor holding structure according to a fourth embodiment.
Figure 11:
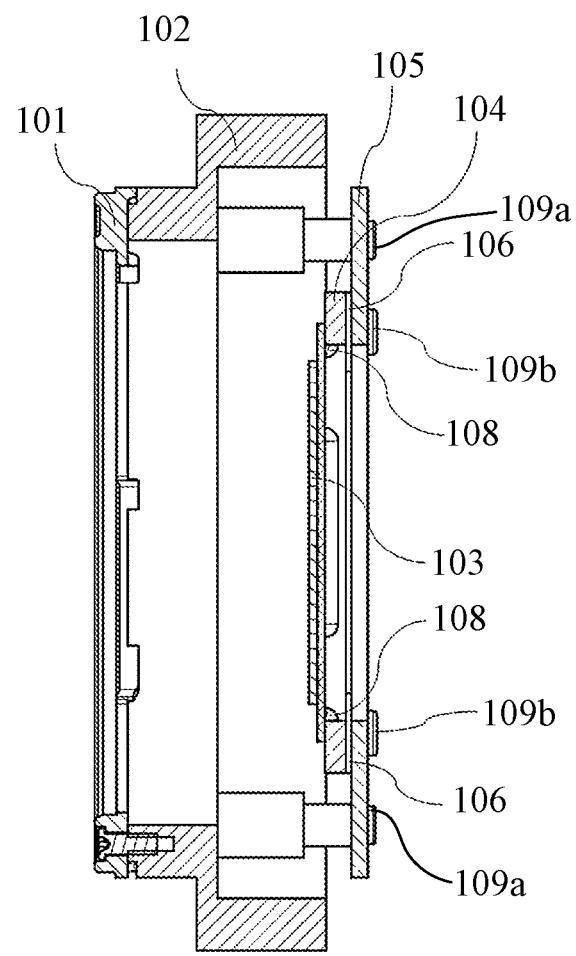
FIG. 11 is a sectional view of the image sensor holding structure according to the fourth embodiment.

FIG. 10 illustrates an exploded image sensor holding structure according to a fourth embodiment. FIG. 11 illustrates a section of the image sensor holding structure according to this embodiment. Those elements in FIGS. 8A, 8B, and 9, which are corresponding elements of the first embodiment, will be designated by the same reference numerals.

In this embodiment, intermediate members 106 are disposed between the four corner areas of the second base member 104 and the four corner areas of the first base member 105. Each intermediate member 106 is made of a heat insulating material (adiabatic material) having a thermal conductivity lower than that of the second base member 104. The second base member 104 is fastened to the first base member 105 via the intermediate members 106 with the screws 109b. That is, the second base member 104 and the first base member 105 are not in direct contact. The thermal resistance between the second base member 104 and the first base member 105 becomes larger than that of each of the first and second embodiments in which both the first and second base members 104 and 105 directly contact each other. Therefore, the temperature rise amount of the second base member 104 is larger for the same heat amounts generated from the image sensor 103 and signal processing chip. Hence, the maximum curvature convex amount B of the second base member 104 can be made larger than that of the second embodiment.

Even this embodiment may provide a heat insulating member having a low thermal emissivity between the first base member 105 and the second base member 104, and thereby suppress the heat transfer caused by the radiant heat from the second base member 104 to the first base member 105.

While the image sensor holding structure in the lens interchangeable type camera has been described in each of the above embodiments, an image sensor holding structure having a similar structure may be used for the lens integrated type camera. In this case, an imaging lens unit is fixed to the structural member. Thus, the image pickup apparatus in the disclosure includes both the lens interchangeable type and the lens integrated type.

Each of the above embodiments can suppress a distance change between the final lens surface and the image sensor due to temperature changes without increasing the size or deformation amount of the member (first and second base members) that holds the image sensor.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-005483, filed on Jan. 18, 2022, which is hereby incorporated by reference herein in its entirety.

What is claimed is:

1. An image pickup apparatus comprising, in order from an image side to an object side along an optical axis:
a first base member;
a second base member fixed to the first base member; and
an image sensor substrate having an image sensor mounted thereon, and being fixed to the second base member;
wherein a linear thermal expansion coefficient of the second base member is larger than that of the first base member, and
wherein the image sensor substrate is fixed to the second base member at positions that are located on a bisector of a line segment that connects two positions outside the image sensor when viewed from the optical axis direction.

2. The image pickup apparatus according to claim 1, wherein the linear thermal expansion coefficient of the second base member is larger than that of the first base member so that a deformation amount of a convex shape of the second base member toward the object side at high temperature is larger than that at room temperature.

3. The image pickup apparatus according to claim 1, wherein the second base member is fixed to the first base member so as to allow the second base member to linearly expand toward the object side and to allow the second base member to deform toward the object side due to linear expansion of the second base member in a direction orthogonal to the optical axis.

4. The image pickup apparatus according to claim 3 further comprising a structural member configured to support a lens, wherein the first base member is attached to the structural member together with the second base member movably toward the object side relative to the structural member, and
wherein the image pickup apparatus further comprises a biasing member configured to bias the first base member and the second base member toward the image side.

5. The image pickup apparatus according to claim 1 further comprising a structural member configured to support a lens,
wherein the first base member is attached so as to allow the first base member to linearly expand toward the object side relative to the structural member.

6. The image pickup apparatus according to claim 1, wherein the image sensor substrate is fixed to the second base member at positions that are located on a bisector of at least part of line segments that connect three or more positions outside the image sensor substrate so as to form a polygon when viewed from the optical axis direction.

7. The image pickup apparatus according to claim 6, wherein the three or more positions are positions at which screw fixing the second base member to the first base member is placed.

8. The image pickup apparatus according to claim 1, wherein one of the first base member and the second base member includes a contact portion that protrudes toward a side of and contacts the other of the first base member and the second base member, and
wherein the second base member contacts the first base member only at the contact portion.

9. The image pickup apparatus according to claim 1, wherein the second base member is fixed to the first base member via an intermediate member having a thermal conductivity lower than that of the second base member.

10. The image pickup apparatus according to claim 1, wherein the two positions are positions at which screw fixing the second base member to the first base member is placed.

11. The image pickup apparatus according to claim 1, wherein the image sensor substrate is fixed to the second base member at positions that does not overlap with the straight line connecting an optical axis the image sensor and a position which the second base member is fixed to the first base member.

12. An image pickup apparatus comprising, in order from an image side to an object side along an optical axis:
a first base member;
a second base member fixed to the first base member;
an image sensor substrate having an image sensor mounted thereon, and being fixed to the second base member; and
a structural member configured to support a lens,
wherein a linear thermal expansion coefficient of the second base member is larger than that of the first base member, and
wherein the image sensor substrate is fixed to the second base member at positions that does not overlap with the straight line connecting an optical axis the image sensor and a position which the second base member is fixed to the first base member.

13. The image pickup apparatus according to claim 12, wherein the linear thermal expansion coefficient of the second base member is larger than that of the first base member so that a deformation amount of a convex shape of the second base member toward the object side at high temperature is larger than that at room temperature.

14. The image pickup apparatus according to claim 12, wherein the second base member is fixed to the first base member so as to allow the second base member to linearly expand toward the object side and to allow the second base member to deform toward the object side due to linear expansion of the second base member in a direction orthogonal to the optical axis.

15. The image pickup apparatus according to claim 14 further comprising a structural member configured to support a lens, wherein the first base member is attached so as to allow the first base member to linearly expand toward the object side relative to the structural member.

16. The image pickup apparatus according to claim 14 further comprising a structural member configured to support a lens, wherein the first base member is attached to the structural member together with the second base member movably toward the object side relative to the structural member, and
wherein the image pickup apparatus further comprises a biasing member configured to bias the first base member and the second base member toward the image side.

17. The image pickup apparatus according to claim 15, wherein the image sensor substrate is fixed to the second base member at positions that are located on a bisector of a line segment that connects two positions outside the image sensor when viewed from the optical axis direction, and
wherein the two positions are positions at which screw fixing the second base member to the first base member is placed.

18. The image pickup apparatus according to claim 12, wherein the image sensor substrate is fixed to the second base member at positions that are located on a bisector of at least part of line segments that connect three or more positions outside the image sensor substrate so as to form a polygon when viewed from the optical axis direction, and
wherein the three or more potions are positions at which screw fixing the second base member to the first base member is placed.

19. The image pickup apparatus according to claim 12, wherein one of the first base member and the second base member includes a contact portion that protrudes toward a side of and contacts the other of the first base member and the second base member, and
wherein the second base member contacts the first base member only at the contact portion.

20. The image pickup apparatus according to claim 12, wherein the second base member is fixed to the first base member via an intermediate member having a thermal conductivity lower than that of the second base member.

* * * * *